United States Patent
Goeloe (10) Patent No.: US 9,694,738 B2
(45) Date of Patent: Jul. 4, 2017

(54) SHAPED-ARRAY LED LICENSE PLATE DISPLAY

(71) Applicant: Glen Goeloe, Cedar Park, TX (US)

(72) Inventor: Glen Goeloe, Cedar Park, TX (US)

( * ) Notice: Subject to any disclaimer, the term of this patent is extended or adjusted under 35 U.S.C. 154(b) by 0 days.

(21) Appl. No.: 15/206,289

(22) Filed: Jul. 10, 2016

(65) Prior Publication Data
US 2017/0043711 A1 Feb. 16, 2017

Related U.S. Application Data

(60) Provisional application No. 62/205,616, filed on Aug. 14, 2015.

(51) Int. Cl.
| | | |
|---|---|---|
| *B60Q 1/56* | (2006.01) | |
| *B60R 13/10* | (2006.01) | |
| *G09F 13/22* | (2006.01) | |
| *G09F 7/18* | (2006.01) | |
| *G09F 13/08* | (2006.01) | |
| *B60R 11/04* | (2006.01) | |

(52) U.S. Cl.
CPC ............. *B60Q 1/56* (2013.01); *B60R 11/04* (2013.01); *B60R 13/105* (2013.01); *G09F 7/18* (2013.01); *G09F 13/08* (2013.01); *G09F 13/22* (2013.01); *G09F 2007/1847* (2013.01); *G09F 2007/1865* (2013.01); *G09F 2007/1895* (2013.01); *G09F 2013/222* (2013.01)

(58) Field of Classification Search
CPC .......... B60Q 1/56; B60Q 13/105; G09F 13/08
See application file for complete search history.

(56) References Cited

U.S. PATENT DOCUMENTS

| | | | | |
|---|---|---|---|---|
| 1,497,282 | A * | 6/1924 | Peterson ................... | B60Q 1/56 40/205 |
| 4,745,525 | A * | 5/1988 | Sheehy ................ | B60Q 1/0011 340/479 |
| 2002/0021210 | A1* | 2/2002 | Naddeo .................... | B60Q 1/56 340/425.5 |
| 2003/0142044 | A1* | 7/2003 | Berry ..................... | B60Q 1/503 345/55 |
| 2003/0156038 | A1* | 8/2003 | Hankins .................... | G09F 9/33 340/815.45 |
| 2003/0234724 | A1* | 12/2003 | Chiu ........................ | B60Q 1/34 340/464 |
| 2011/0078933 | A1* | 4/2011 | Lukawitz ............... | B60Q 1/503 40/204 |
| 2015/0194082 | A1* | 7/2015 | McEwan ............... | G09F 21/048 40/209 |
| 2016/0321966 | A1* | 11/2016 | Llamas Gomez ....... | B60Q 1/56 |

* cited by examiner

*Primary Examiner* — Gary C Hoge
(74) *Attorney, Agent, or Firm* — Pierson IP, PLLC (57) ABSTRACT

Embodiments disclosed herein describe systems and methods for a license-plate-sized enclosure that includes translucent and opaque films with personalized images and a printed circuit board. The license plate enclosure may incorporate shaped-arrays of LEDs that are substantially conformed to the shape of the translucent portions of the films and are used to illuminate the translucent portions.

12 Claims, 11 Drawing Sheets

FIG. 10 ns of some of the elements in the figures may be exag-
SHAPED-ARRAY LED LICENSE PLATE DISPLAY

CROSS-REFERENCE TO RELATED APPLICATIONS

This application claims a benefit of priority under 35 U.S.C. §119 to Provisional Application No. 62,205,616 filed on Aug. 14, 2015, which is fully incorporated herein by reference in its entirety.

BACKGROUND INFORMATION

Field of the Disclosure

Examples of the present disclosure relate generally to license plate displays.

Background

Vanity license plates conventionally display customized wording and characters on license plates. However, Conventional vanity license plates are limited in terms of the vibrancy of the personalization by being restricted to standard fonts, lettering and plate backgrounds that official license plate providers have available.

Additionally, conventional vanity license plates may be illuminated by using various light sources. The light sources on vanity license plates may be protected by enclosures that are configured to protect the light sources and license plates from road damage and weather. However, the current enclosures do not assist in mitigating heat related issues for the light sources.

Accordingly, needs exist for more effective and efficient systems and methods for customized license plates with enclosures that are configured to assist in mitigating environmental related issues.

SUMMARY

Embodiments disclosed herein describe systems and methods for a license-plate-sized enclosure that includes translucent and opaque films with personalized images and a printed circuit board. The license plate enclosure may incorporate shaped-arrays of LEDs that substantially conforme to the shape of the translucent portions of the films and are used to illuminate the translucent portions.

In broad embodiment, the present invention is a license-plate-sized enclosure that contains translucent and opaque films with personalized images and a printed circuit board, which incorporates shaped-arrays LEDs that are substantially conformed to the shape of the translucent portions of the films and are used to illuminate the translucent portions. In sum, the Shaped-Array LED License Plate Display invention provides a low cost apparatus, which is easy to manufacture and which facilitates vibrantly lit personalized license plate displays.

In embodiments, the enclosure may utilize circuit boards with arrays of LEDs that are precisely shaped to enhance the illumination, brightness, contrast, and color variety of translucent and opaque films that portray a personalized image. Additionally, the shaped-array of LEDs can blink or scroll from top to bottom or from side to side for esthetic effects. These esthetics may be remotely controlled.

Embodiments may include LEDs that are substantially same shape as the translucent portions of the film. Embodiments may also include a logic module, a boost module, a driver module, a remote control module, an interface circuit, and an integrated fuse, which has ESD protection that meets automotive standards, and which is entirely enclosed within the aerodynamic polycarbonate enclosure. The interface circuit may include a security module, which comprises a security camera, a pressure sensor, a GPS sensor and an alarm; three exterior wires, which extend from the aerodynamic polycarbonate enclosure and connect the printed circuit board to the automobile; and a RF remote control transmitter and receiver.

The advantages of the present invention include, without limitation, that it provides shaped-arrays of LEDs, which are brighter than a mere strip of LEDs and focus intense light on illuminated portions of a personalized image while consuming less power than a full array of LEDs. Further, the inclusion of ventilation holes prevents the LEDs from overheating.

Additionally, the use of translucent and opaque portions of the film allows for improved contrast during the day, as well as the night. Moreover, the use of a single printed circuit board for substantially all of the electronics enables the Shaped-Array LED License Plate Display invention to be easily manufactured.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Embodiments disclosed herein describe systems and methods for a license plate enclosure that includes translucent and opaque films with personalized images on a printed circuit board configured to effectively and efficiently dissipate heat and protect internal elements from the elements.

Figure 1:
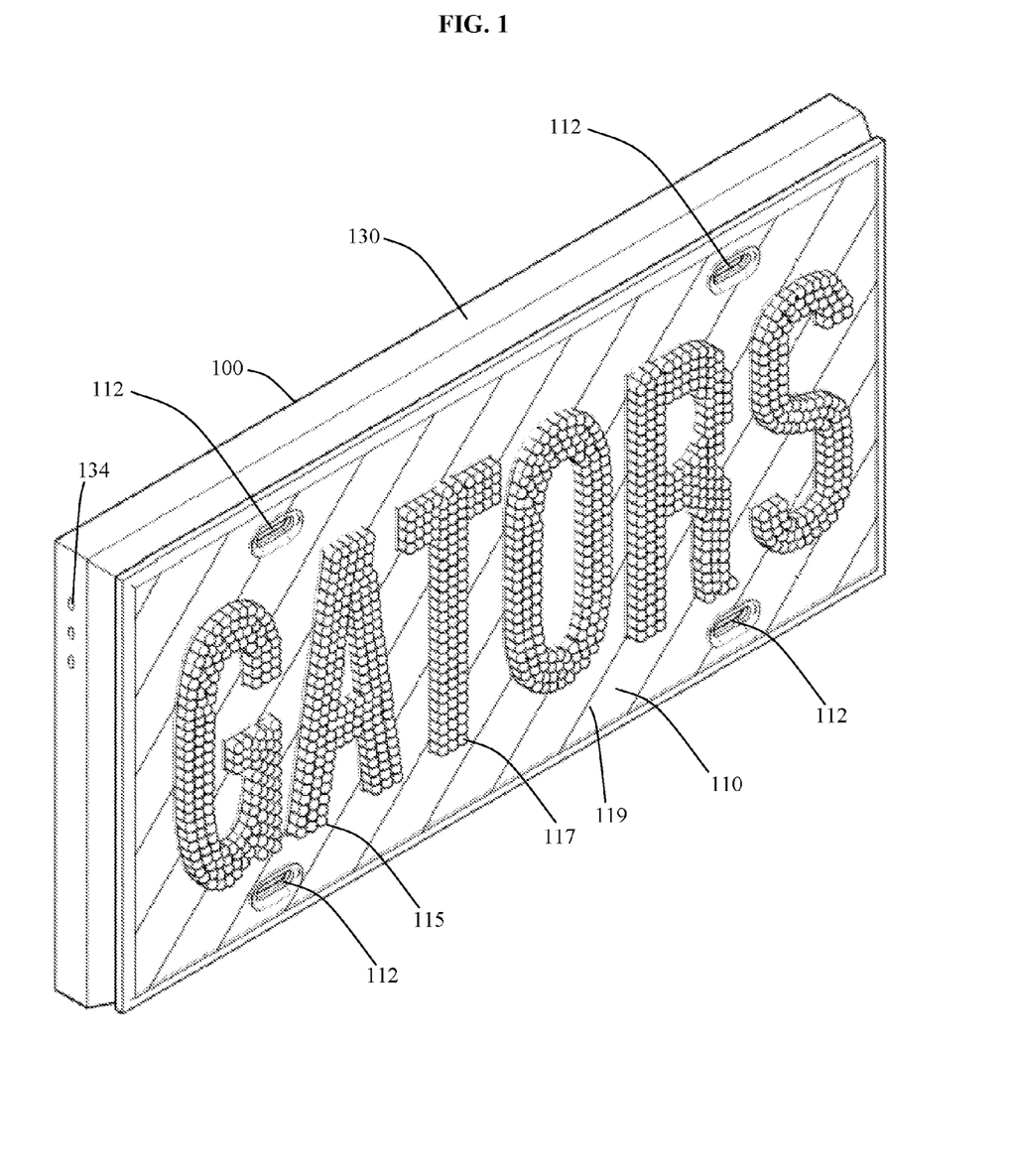
FIG. 1 is a perspective view of a display, according to an embodiment.

FIG. 1 depicts a license plate display 100. Display 100 may include housing 130, Clear coat 119, front vent holes 112, side vent holes 134, printed circuit board 110, and LED arrays 115.

Housing 130 may be a protective enclosure that is configured to store and protect the elements of display 100. Housing 130 may be comprised of various rigid materials, such as plastics, polymers, metals, polycarbonate, plastic, glass, ceramic, composite materials, etc. that are transparent, aerodynamic, and weather resistant. Housing 130 may be shaped to be aerodynamic while allowing air to enter housing 130 to reduce the amount of heat associated with display 100. Housing 130 may also be configured to limit water and other elements from enter housing 130. Housing 130 may include clear coat 119, mounting brackets 112, and side vents 134.

Clear coat 119 may be a transparent cover that is configured to protect elements of display 100 positioned within housing 100. Clear coat 119 may have a perimeter that is substantially the same size as that of housing 130, and may have a depth that is less than that of housing 130.

Mounting brackets 112 may be configured to allow housing 130 to be coupled with an automobile via press fitting or any other desired coupling mechanisms. Mounting brackets 112 may be configured to be pressed into locking mechanisms positioned within housing 130 to removably couple with elements of display 100 and an automobile. Mounting brackets 112 may be holes, offices, etc. positioned on through housing 130. The plurality of mounting brackets 112 may be positioned proximate to the edges housing 130.

Side vents 134 may be holes, offices, etc. positioned on a sidewall of housing 130. Side vents 123 may be configured to be positioned proximate towards a rear, upper corner of housing 130. Side vents 134 may be configured to allow air positioned outside of housing 130 to enter into an internal chamber within housing 130, or allow air positioned within the internal chamber to exit the internal chamber and be positioned outside of housing 130.

Printed circuit board 110 may be a device that is configured to mechanically support and electrically connect electronic components using conductive tracks, pads, and other features etched from copper sheets laminated onto a non-conductive substrate. In embodiments, printed circuit board 110 may be a single integrated circuit board, which comprises the various electronic modules, such as the logic module, a boost module, driver module, remote control module, interface circuit, integrated fuse, and the like, and may be electrically connected to LED shaped arrays 115 comprising a plurality of fixed LEDs 117.

LED shaped arrays 115 may be comprised of fixed light emitting diodes (LEDs) 117. LED shaped array 115 may be configured to provide a visual display by emitting light. In embodiments, LED shaped arrays 115 may be any desired shape and/or size, such that a user may positioned fixed LEDs 117 on the LED shaped array 115 to customize a displayed image. In embodiments, the LED shaped arrays 115 may be configured to be centrally located within the printed circuit board 110, while the electronic circuitry may be positioned near the edges of printed circuit board 110. As the LED shaped arrays 115 may generate more heat than the circuitry, housing 130 may be configured to effectively and efficiently dissipate the heat within the internal chamber within housing 130.

Figure 2:
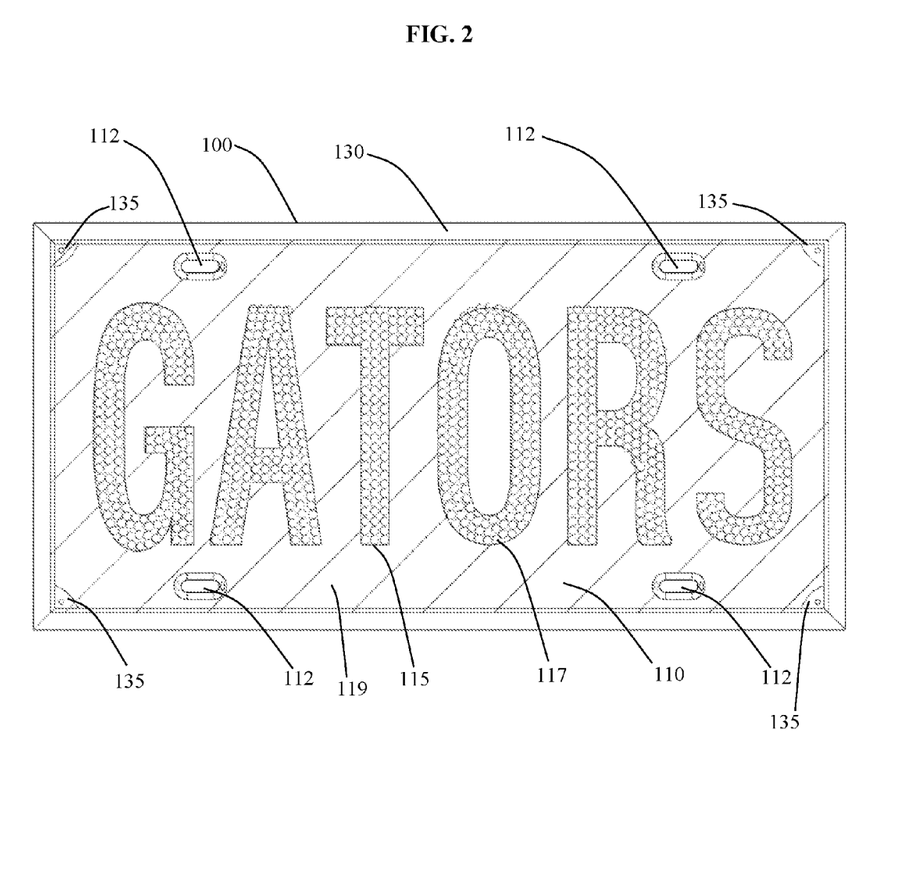
FIG. 2 is a front view of an apparatus of FIG. 1, according to an embodiment.

FIG. 2 depicts a back view of clear coat 119, according to an embodiment. Elements depicted in FIG. 2 may be substantially the same as those described above. For the sake of brevity, a further description of these elements is omitted.

As depicted in FIG. 2, printed circuit board 110 may include a plurality of mounting tabs 135. The plurality of mounting tabs 135 may be positioned proximate to the edge of housing 130, and the plurality of mounting tabs 135 may be configured to couple printed circuit board 110 with housing 130.

Figure 3:
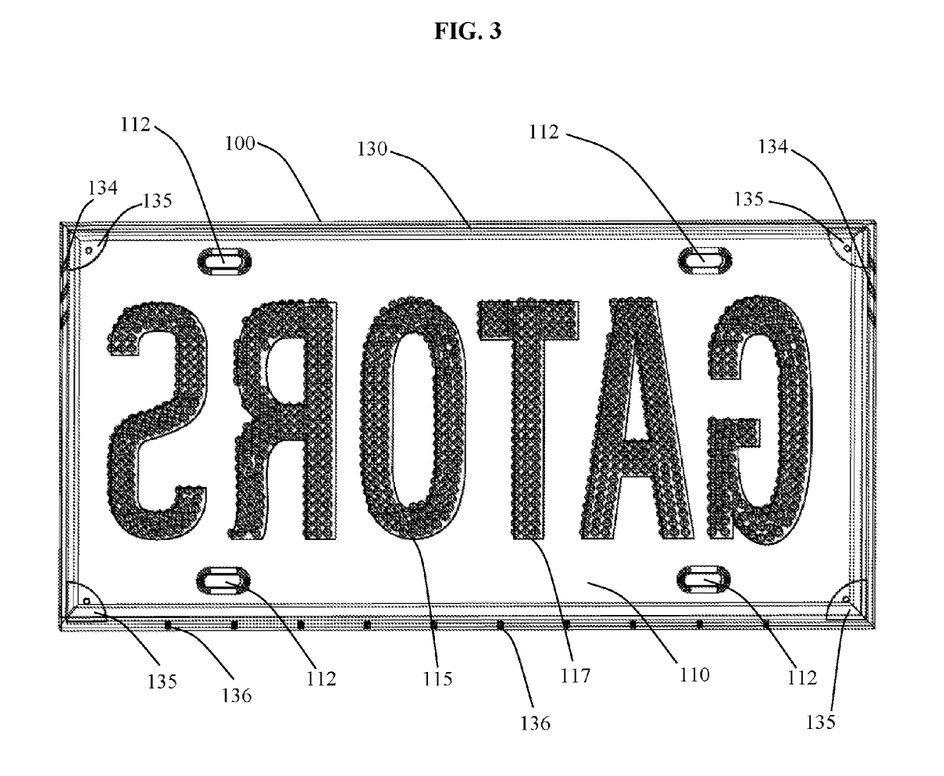
FIG. 3 is a rear view of a display, according to an embodiment.

FIG. 3 depicts a back view of housing 130, according to an embodiment. Elements depicted in FIG. 3 may be substantially the same as those described above. For the sake of brevity, a further description of these elements is omitted.

As depicted in FIG. 3, housing 130 may include a plurality of side vents 134, and a plurality of drainage vents 136.

The plurality of side vents 134 may be positioned on an upper portion of the sidewalls of housing 130, and may extend at a downward angle towards the sidewalls of housing 130. The upward angle of side vents 134 may allow for air to enter and exit an internal chamber within housing 130, while limiting water, debris, and other elements from entering into the internal chamber within housing 130. Furthermore, by having side vents 134 be positioned at an upward angle, as the vehicle is moving, air may enter the internal chamber via drainage vents pushing hot air within the internal chamber to be released outside of the internal chamber.

The plurality of drainage vents 136 may be positioned on a lower edge of housing 130, and may extend in a direction perpendicular to the lower edge of housing 130. To this end, the angle of side vents 134 may be slanted in regards to the angle of drainage vents 136. The plurality of drainage vents 136 may be positioned at substantially even intervals from a first sidewall of housing 130 to a second side sidewall of housing 130. The plurality of drainage vents 136 may be configured to allow air to enter and exit the internal chamber within housing 130. Furthermore, the plurality of drainage vents 136 may be configured to allow water, debris, and other elements from dropping out of the internal chamber within housing 130. As a vehicle moves, air from outside the internal chamber may be moved into the internal chamber to automatically cool display 100.

Figure 4:
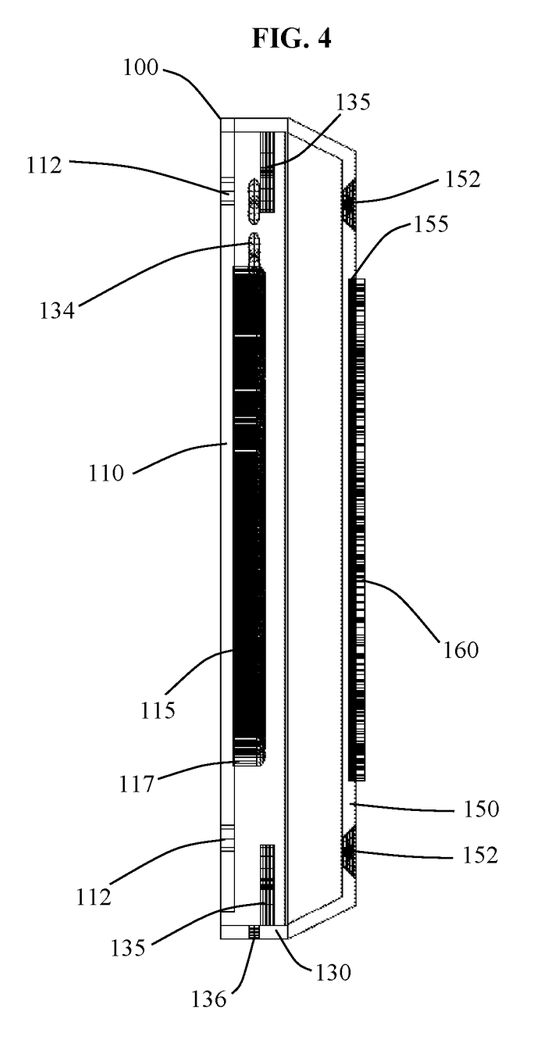
FIG. 4 is a left side view of a display, according to an embodiment.

FIG. 4 depicts a first side view of display 100, according to an embodiment. Elements depicted in FIG. 4 may be substantially the same as those described above. For the sake of brevity, a further description of these elements is omitted.

As depicted in FIG. 4, printed circuit board 110 may be positioned proximate to a rear of display 100 within a hollow chamber of housing 130. LED array 115 may be positioned substantially in the middle of the printed circuit board 110, such that heat emitted within the internal chamber may exit the internal chamber via side vents 134 and drainage vents 136.

Positioned in front of printed circuit board 110 may be a plurality of films 150. The films 150 may comprise a lightweight and thin material that is either opaque or translucent and that is resistant to the heat generated by the LED shaped-arrays 115, such as plastic, polycarbonate, glass, celluloid, or the like. The plurality of films may include translucent portions 155 and opaque portions 160. The plurality of films 150 may be coupled to housing 130 via film mounting holes 152. In embodiments, film mounting holes 152 may be configured to align with mounting brackets 112.

The translucent portions 155 may be shaped to be substantially the same shape and size as LED array 115, and translucent portions 155 may be configured to allow LED array 115 to more clearly emit light. In embodiments, translucent portions 155 may be configured to be positioned between opaque portions 160 and LED array 115.

The opaque portions 160 may be shaped to be substantially the same shape and size as LED array 115, and opaque portions 160 may be configured to allow LED array 115 to more clearly emit light. In embodiments, opaque portions 160 may be configured to be positioned in front of or within cutouts of translucent portions 155. Opaque portions 160 may have a depth that is greater than that of translucent portion 155, and may have a rear surface that is configured to be positioned with the plurality of films 150 and have a front surface that is configured to project away from plurality of films 150.

The LED shaped-arrays 115 may be precisely and efficiently arranged to substantially conform with the shape of the translucent portions 155 of the film 150, to maximize the number of fixed individual LEDs 117 per given area of a translucent portion 155 without using excessive fixed individual LEDs 117. This efficient use of LED shaped-arrays 115 may maximize the brightness, contrast, and possible color variability, of the illuminated portions of the film 150, while limiting excessive fixed individual LEDs 117 that consume excessive power and emit excessive heat. The LED shaped-arrays 115 may also provide esthetic effects by blinking or scrolling from top to bottom or from side to side. The use of LED shaped-arrays 115 increases the expressiveness of personalized displays and is more eye-catching than uniform arrays of LEDs or personalized displays that merely use indirect and uniform lighting.

Figure 5:
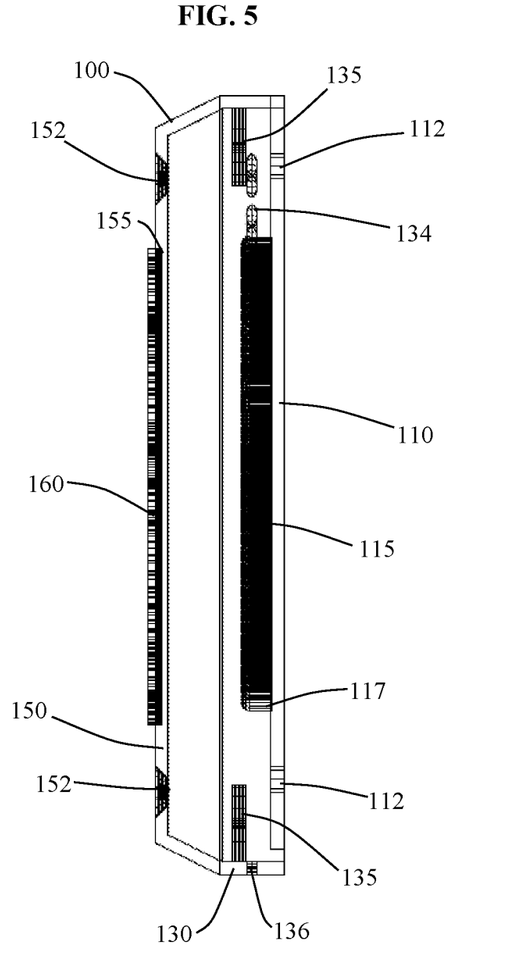
FIG. 5 is a right side view of a display, according to an embodiment.

FIG. 5 depicts a second side view of display 100, according to an embodiment. Elements depicted in FIG. 5 may be substantially the same as those described above. For the sake of brevity, a further description of these elements is omitted.

Figure 6:
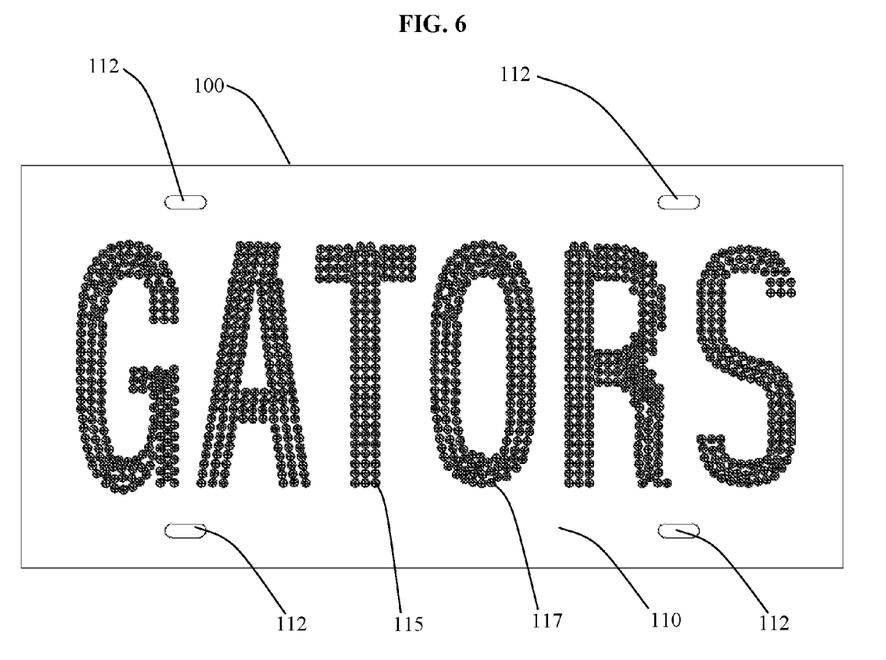
FIG. 6 is a front view of a LED circuit board of a display, according to an embodiment.

FIG. 6 depicts a front view of printed circuit board 110, according to an embodiment. Elements depicted in FIG. 6 may be substantially the same as those described above. For the sake of brevity, a further description of these elements is omitted.

Figure 7:
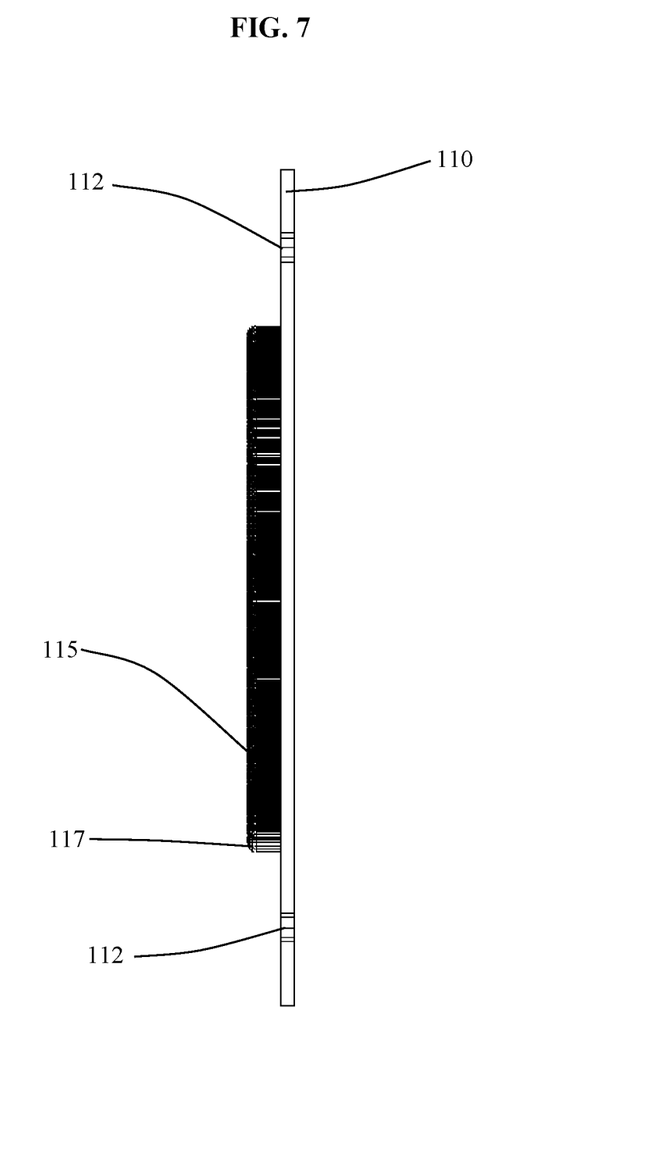
FIG. 7 is a side view of a LED circuit board of a display, according to an embodiment.

FIG. 7 depicts a side view of printed circuit board 110, according to an embodiment. Elements depicted in FIG. 7 may be substantially the same as those described above. For the sake of brevity, a further description of these elements is omitted.

As depicted in FIG. 7, the fixed LEDs 117 of LED shaped arrays 115 may project away from a surface of printed circuit board 110. In embodiments, LEDs 117 may have a first surface that is coupled to a surface of printed circuit board 110, and a second surface that is positioned away from the surface of printed circuit board 110. Additionally, the height of LEDs 117 may be greater than the thickness of printed circuit board 110.

Furthermore, mounting brackets 112 may extend through the printed circuit board 110.

Figure 8:
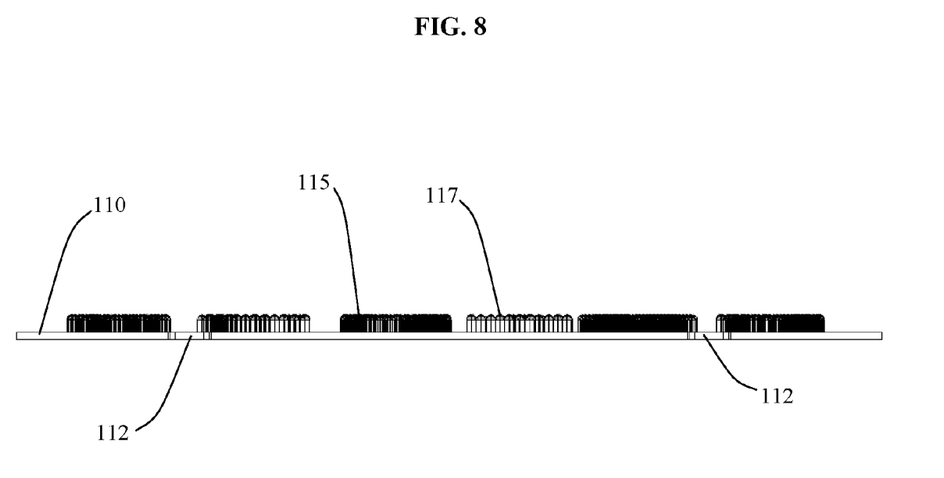
FIG. 8 is a top view of a LED circuit board of a display, according to an embodiment.

FIG. 8 depicts a top view of printed circuit board 110, according to an embodiment. Elements depicted in FIG. 8 may be substantially the same as those described above. For the sake of brevity, a further description of these elements is omitted.

Figure 9:
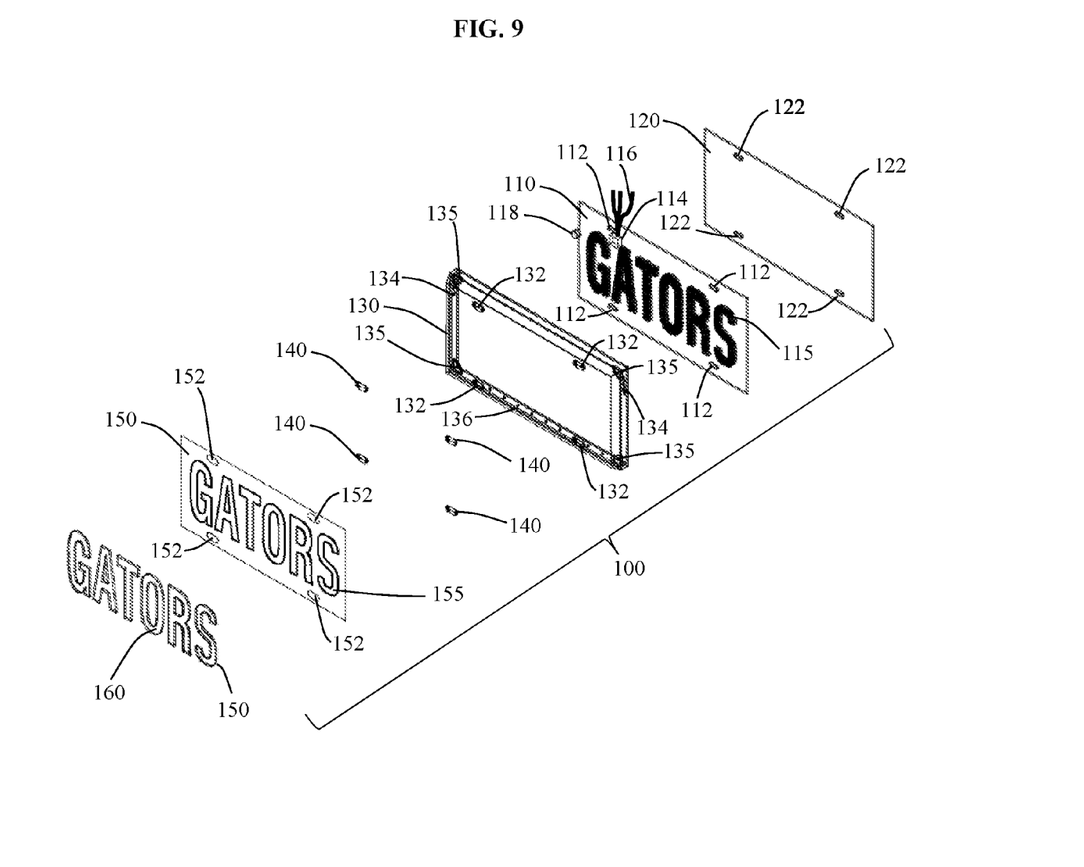
FIG. 9 is an exploded perspective view of a display, according to an embodiment.

FIG. 9 depicts an exploded view of elements of display 100, according to an embodiment. Elements depicted in FIG. 9 may be substantially the same as those described above. For the sake of brevity, a further description of these elements is omitted.

As depicted in FIG. 9, display 100 may include back plate 120, circuit board 110, housing 130, spacers 140, film 150, and opaque portions 160.

Back plate 120 may be a backing configured to be positioned between circuit board 110 and a surface of an automatable. Back plate 120 may include a substantially planar surface with a shape that is substantially the same as circuit board 110. Back plate 120 may include a plurality of back plate mounting holes 122 that are configured to mount display 100 to an automobile. In embodiments, back plate mounting holes 122 may be configured to align with circuit board mounting holes 112 and mounting holes 132.

In embodiments, circuit board 110 may include electronic components and circuits that extend substantially around the edges of circuit board 110, while LED array 115 may be more centrally located within circuit board 110. This may allow circuit board 110 and display 100 to more effectively and efficiently disseminate heat. For example, circuit board 110 may include a control module 114, which may include a logic module, a boost module, a driver module, a remote control module, an interface circuit, and an integrated fuse, which has ESD protection that meets automotive standards, and which is entirely enclosed within housing 130. Circuit board 110 may also include a security module 118 that includes a security camera, a pressure sensor, a GPS sensor, and an alarm. Circuit board 110 may also include exterior wires 116 that extend from circuit board 110 through housing 110 to connect with an automobile 180.

Spacers 140 may be configured to be positioned between an outer surface of housing 130 and film 150. Spacers 140 may be configured to separate housing 130 from film 150.

As depicted in FIG. 9, opaque portions 160 may be configured to be shaped and/or sized substantially similar to translucent portions 155.

Figure 10:
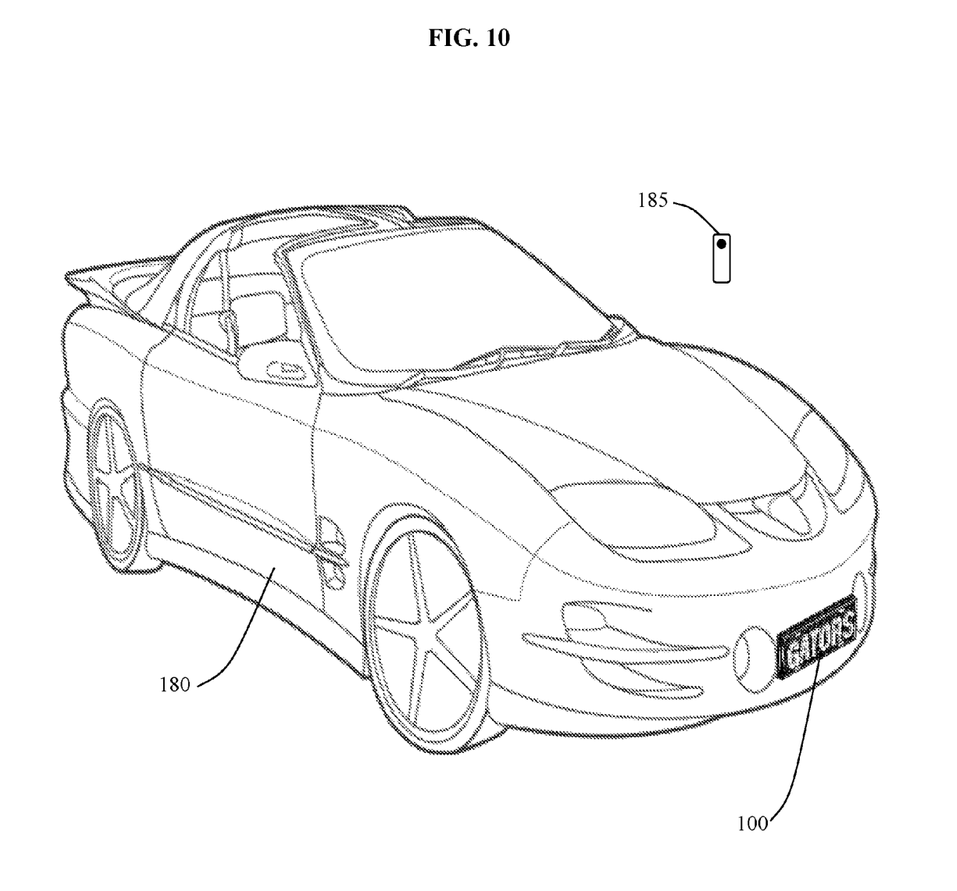
FIG. 10 is a perspective view of the apparatus of a display mounting to an automobile, according to an embodiment.

FIG. 10 depicts an exploded view of elements of display 100, according to an embodiment. Elements depicted in FIG. 10 may be substantially the same as those described above. For the sake of brevity, a further description of these elements is omitted.

As depicted in FIG. 10, display 100 may be coupled to an automobile 180. Display 100 may be positioned on an automobile on a location where license plates are generally positioned. As further depicted in FIG. 10, display 100 may be remotely controlled by a RF remote control transmitter and receiver 185. RF remote control 185 may be configured to control the illumination of display 100.

Figure 11A:
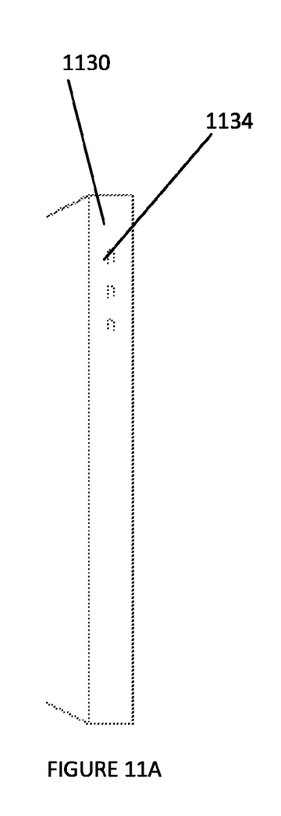
FIGS. 11A-C depict various views of a display device, according to an embodiment.
Figures 11B, 11C, 12:
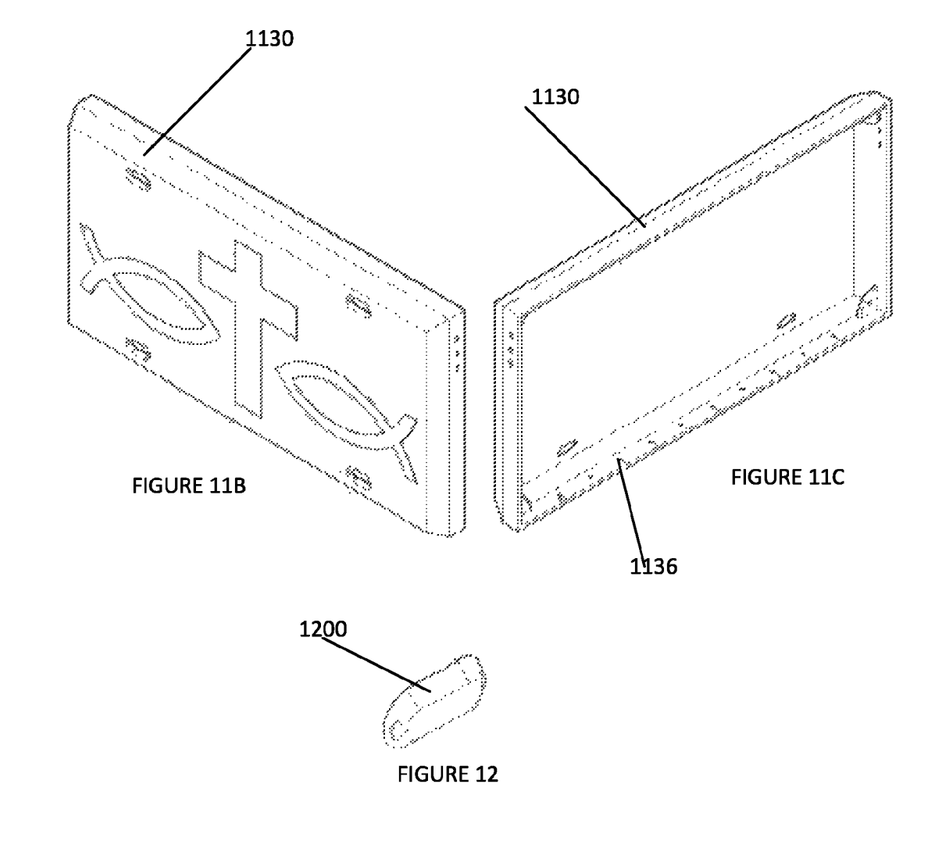
FIG. 12 depicts a plug, according to an embodiment.

FIGS. 11A-C depict various views of a display device 1100, according to an embodiment. Elements depicted in FIG. 11 may be substantially the same as those described above. For the sake of brevity, a further description of these elements is omitted.

As depicted in FIGS. 11A-C, display device 1100 may have various images on the front panel of housing 1130, which may be customizable. In embodiments, the LED arrays that are laid out to correspond with the images may also be customizable.

As depicted in FIG. 11A, a side surface of housing 1130 may include a plurality of side vents 1134 that are vertically aligned with one another.

As depicted in FIG. 11B, the front face of housing 1130 may have customizable image patterns, which may be any desired image.

As depicted in FIG. 11C, a lower surface of housing 1130 may include a plurality of drainage vents 1136. The plurality of drainage vents 1136 may be horizontally aligned with each other, and positioned at even partitions along the lower surface of housing 1130.

FIG. 12 depicts a plug 1200, according to an embodiment. Elements depicted in FIG. 12 may be substantially the same as those described above. For the sake of brevity, a further description of these elements is omitted.

Plug 1200 may be configured to be positioned within mounting brackets 112. Responsive to positioned plug 1200 within a mounting bracket 112, the mounting bracket 112 may be sealed such that water or air may not be able to enter or exit the internal chamber within housing 1130.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

What is claimed is:

1. An LED license plate display comprising:
    a printed circuit board with an LED array;
    a housing configured to house the printed circuit board with the LED array;
    side vents positioned on sidewalls of the housing, the side vents being upwardly angled;
    drainage vents positioned a lower sidewall of the housing;
    a translucent film configured to cover a front surface of the housing;
    an opaque film configured to cover portions of the translucent film.

2. The display of claim 1, wherein the printed circuit board is positioned on a rear surface of the housing, and the LED array extends into an internal chamber within the housing.

3. The display of claim 2, wherein the side vents and the drainage vents are vertically aligned.

4. The display of claim 1, wherein the side vents are configured to dissipate heat generated by the printed circuit board with the LED array.

5. The display of claim 1, wherein the drainage vents are positioned perpendicularly to a longitudinal axis of the display.

6. The display of claim 1, further comprising a backing plate configured to be positioned behind a rear surface of the housing.

7. The display of claim 1, wherein the display is configured to be coupled with an automobile.

8. The display of claim 1, wherein the printed circuit board, housing, and translucent film have aligned mounting brackets.

9. The display of claim 1, wherein the LED array may be remotely controlled.

10. The display of claim 1, further comprising an embedded camera.

11. The display of claim 1, further comprising an embedded alarm.

12. The display of claim 1, further comprising an embedded GPS device.

* * * * *